United States Patent
Hansen et al.

(10) Patent No.: US 7,331,761 B2
(45) Date of Patent: Feb. 19, 2008

(54) WIND TURBINE PITCH BEARING AND METHOD

(75) Inventors: Scott A. Hansen, Muskegon, MI (US); David J. VanLangevelede, Spring Lake, MI (US)

(73) Assignee: Kaydon Corporation, Muskegon, MI (US)

( * ) Notice: Subject to any disclaimer, the term of this patent is extended or adjusted under 35 U.S.C. 154(b) by 124 days.

(21) Appl. No.: 11/271,863

(22) Filed: Nov. 10, 2005

(65) Prior Publication Data
US 2007/0104577 A1    May 10, 2007

(51) Int. Cl.
*B63H 3/00* (2006.01)

(52) U.S. Cl. .................. 416/11; 416/159; 415/2.1; 415/908

(58) Field of Classification Search .......... 415/2.1, 415/4.3, 4.5, 905, 908; 416/11, 111, 159, 416/162, 168 R, 46, 153
See application file for complete search history.

(56) References Cited

U.S. PATENT DOCUMENTS

| | | | |
|---|---|---|---|
| 785,369 A | 3/1905 | Meinecke | |
| 2,438,542 A | 3/1948 | Cushman | |
| 2,566,696 A | 9/1951 | Cushman | |
| 2,573,783 A * | 11/1951 | Anderson et al. | 416/158 |
| 2,727,580 A | 12/1955 | Adrian et al. | |
| 3,876,334 A | 4/1975 | Andrews | |
| 3,888,357 A | 6/1975 | Bauer et al. | |
| 3,893,789 A | 7/1975 | Andrews | |
| 4,047,842 A * | 9/1977 | Avena et al. | 416/152 |
| 4,934,901 A * | 6/1990 | Duchesneau | 416/46 |
| 4,968,217 A | 11/1990 | Newton | |
| 5,876,181 A * | 3/1999 | Shin | 415/2.1 |
| 5,954,479 A * | 9/1999 | Smith | 416/125 |

FOREIGN PATENT DOCUMENTS

WO    WO 2005/057008 A1    6/2005

OTHER PUBLICATIONS

Kaydon Corporation, "Quality Turbine Bearings for Wind Energy—Turning Ideas Into Engineered Solutions," Kaydon Corporation (Muskegon, Michigan), 4 pages, (Date Unknown—Prior to Nov. 10, 2005).

* cited by examiner

*Primary Examiner*—Igor Kershteyn
(74) *Attorney, Agent, or Firm*—Price, Heneveld, Cooper, DeWitt & Litton, LLP (57) ABSTRACT

A pitch bearing and related method for wind electric turbines has an annularly-shaped first bearing ring connected with an associated wind turbine blade, and includes a first raceway groove. An annularly-shaped second bearing ring is connected with the rotor portion of the wind turbine, and includes a second raceway groove aligned with the first raceway groove. Rolling elements are positioned in the first and second raceway grooves to rotatably interconnect the two bearing rings. A gear segment is formed on one of the bearing rings, and is configured to engage a pitch drive portion of the wind turbine to pivot the blade axially between different pitch angles. The gear segment has an arcuate measure of less than 200 degrees to facilitate economical manufacture.

26 Claims, 5 Drawing Sheets

WIND TURBINE PITCH BEARING AND METHOD

BACKGROUND OF THE INVENTION

The present invention relates to wind turbines and the like, and in particular to a pitch bearing therefore.

Wind turbines, such as those designed to generate electrical power, are well known in the art. Large, sophisticated wind turbines typically include a mechanism for axially pivoting the turbine blade relative to the rotor hub to shift the blade between different pitch angles to achieve maximum efficiency. Large pitch bearings are required to pivotally mount the turbine blades to the rotor hubs, which must be made to precise specifications and meet expecting standards for such applications. Furthermore, the pitch bearings are typically equipped with a full circle ring gear to facilitate rotating the turbine blades through associated geared pitch drives. While such prior art pitch bearings have proven to be quite functional, they are expensive to manufacture, assemble and repair.

Hence, it would be clearly advantageous to provide a pitch bearing which is more economical to manufacture, assemble and repair.

SUMMARY OF THE INVENTION

One aspect of the present invention is a wind electric turbine of the type having a rotor hub supporting at least one radially extending blade, and a pitch drive for axially pivoting the blade between different pitch angles. The wind turbine includes a pitch bearing, comprising an annularly-shaped first bearing ring operably connected with the blade, and including a first raceway groove, and an annularly-shaped second bearing ring operably connected with the rotor hub, configured for mating engagement with the first bearing ring, and including a second raceway groove aligned with the first raceway groove. A plurality of rolling elements are disposed in the first and second raceway grooves to rotatably interconnect the first and second bearing rings. A gear segment is formed on one of the first and second bearing rings, and engages the pitch drive to pivot the blade axially between the different pitch angles. The gear segment has an accurate measure of less than 200 degrees to facilitate economical manufacture.

Another aspect of the present invention is a method for making a wind electric turbine of the type having a rotor hub supporting at least one radially extending blade, and a pitch drive for axially pivoting the blade between different pitch angles. The method includes forming an annularly-shaped first pitch bearing ring with a first raceway groove, and an annularly-shaped second pitch bearing ring with a second raceway groove. The method further includes positioning one of the first and second pitch bearing rings within the other, such that the first raceway groove aligns with the second raceway groove. The method further includes forming a plurality of rolling elements shaped for close reception in the first and second raceway grooves, and positioning the rolling elements in the first and second raceway grooves in a predetermined circumferentially-shaped arrangement to rotatably interconnect the first and second pitch bearing rings. The method further includes forming a gear segment on one of the first and second pitch bearing rings with an accurate measure of less than 200 degrees to facilitate economical manufacture, and operably connecting the blade with one of the first and second pitch bearing rings, and the rotor hub with the other of the first and second pitch bearing rings. Further, the method includes engaging the pitch drive with the gear segment to pivot the blade axially between the different pitch angles.

Yet another aspect of the present invention is a pitch bearing for wind turbines of the type having a rotor hub supporting at least one radially extending blade, and a pitch drive for axially pivoting the blade between different pitch angles. The pitch bearing includes an annularly-shaped first bearing ring configured for operable connection with the blade, and including a first raceway groove, as well as an annularly-shaped second bearing ring configured for operable connection with the rotor hub, matingly engaging the first bearing ring, and including a second raceway groove aligned with the first raceway groove in the first bearing ring. A plurality of rolling elements are disposed in the first and second raceway grooves to rotatably interconnect the first and second bearing rings. A gear segment is formed on one of the first and second bearing rings, and is configured to engage the pitch drive to pivot the blade axially between the different pitch angles. The gear segment has an accurate measure of less than 200 degrees to facilitate economical manufacture.

Another aspect of the present invention is to provide a wind turbine pitch bearing which is efficient in use, economical to manufacture, capable of a long operating life and particularly well adapted for the proposed use. The pitch bearing is capable of use in both high or low wind speed applications, as well as land based or off shore installations.

These and other advantages of the invention will be further understood and appreciated by those skilled in the art by reference to the following written specification, claims and appended drawings.

DETAILED DESCRIPTION OF THE PREFERRED EMBODIMENTS

Figure 4:
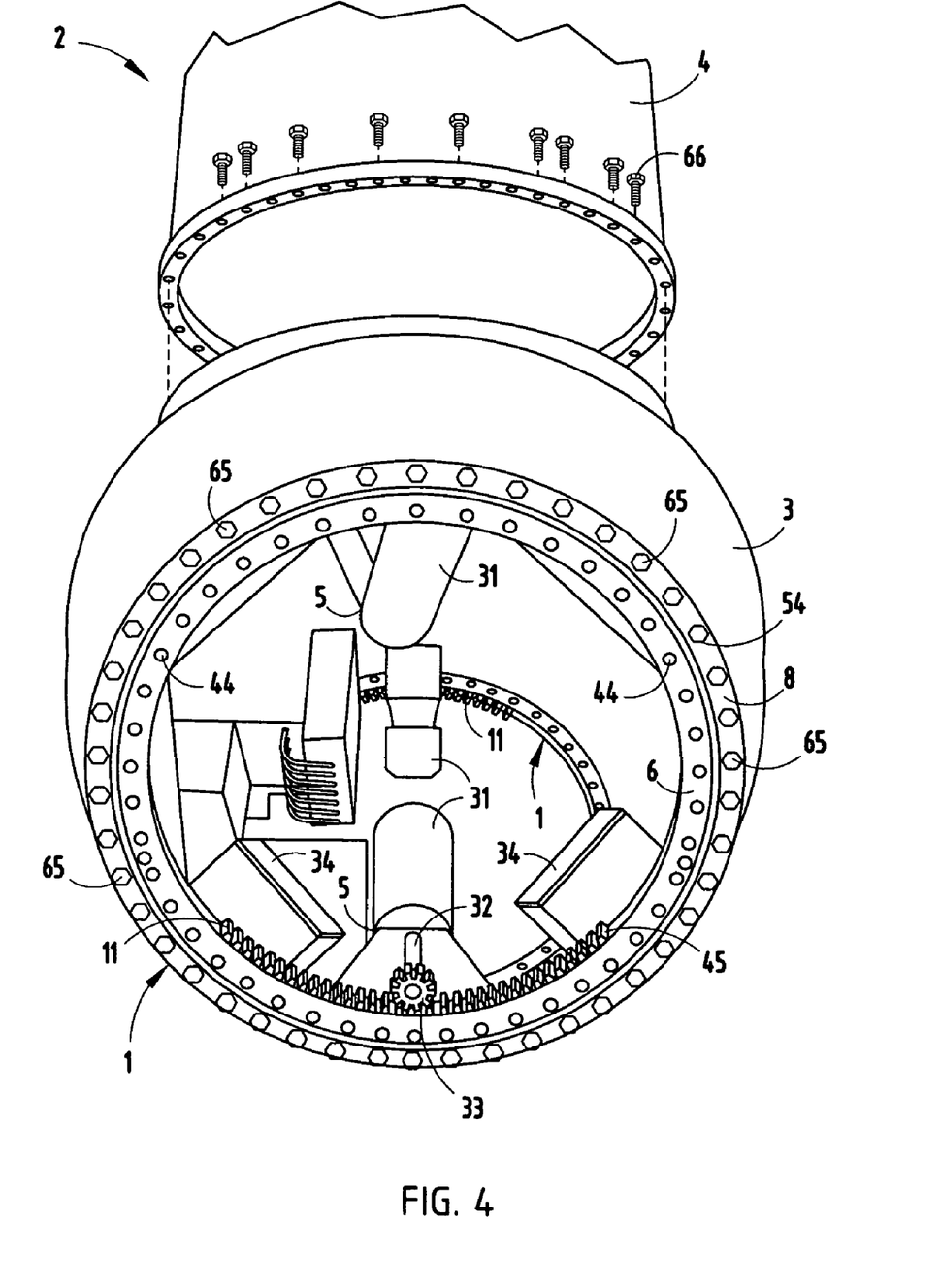
FIG. 4 is an exploded perspective view of rotor hub and blade portions of the wind electric turbine with pitch bearings embodying the present invention installed therein.

For purposes of description herein, the terms "upper", "lower", "right", "left", "rear", "front", "vertical", "horizontal", and derivatives thereof shall relate to the invention as oriented in FIG. 4. However, it is to be understood that the invention may assume various alternative orientations and step sequences, except where expressly specified to the contrary. It is also to be understood that the specific devices and processes illustrated in the attached drawings, and described in following specification, are simply exemplary embodiments of the inventive concepts defined in the appended claims. Hence, the specific dimensions and other physical characteristics relating to the embodiments disclosed herein are not to be considered as limiting, unless the claims expressly state otherwise.

Figure 5:
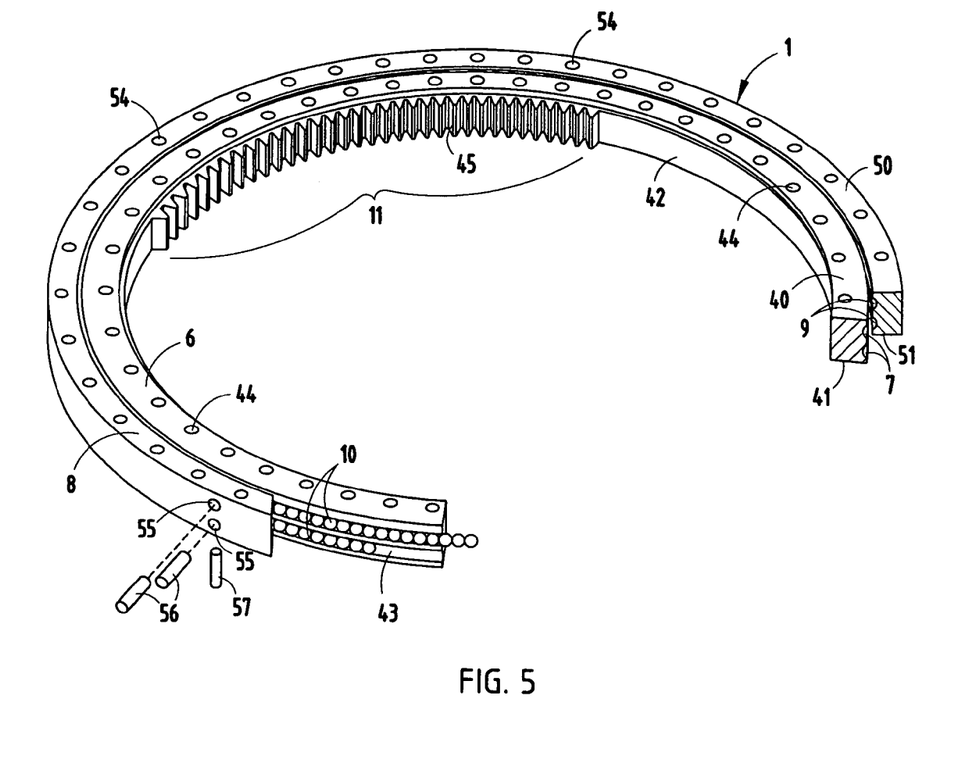
FIG. 5 is a fragmentary perspective view of the pitch bearing.
Figure 6:
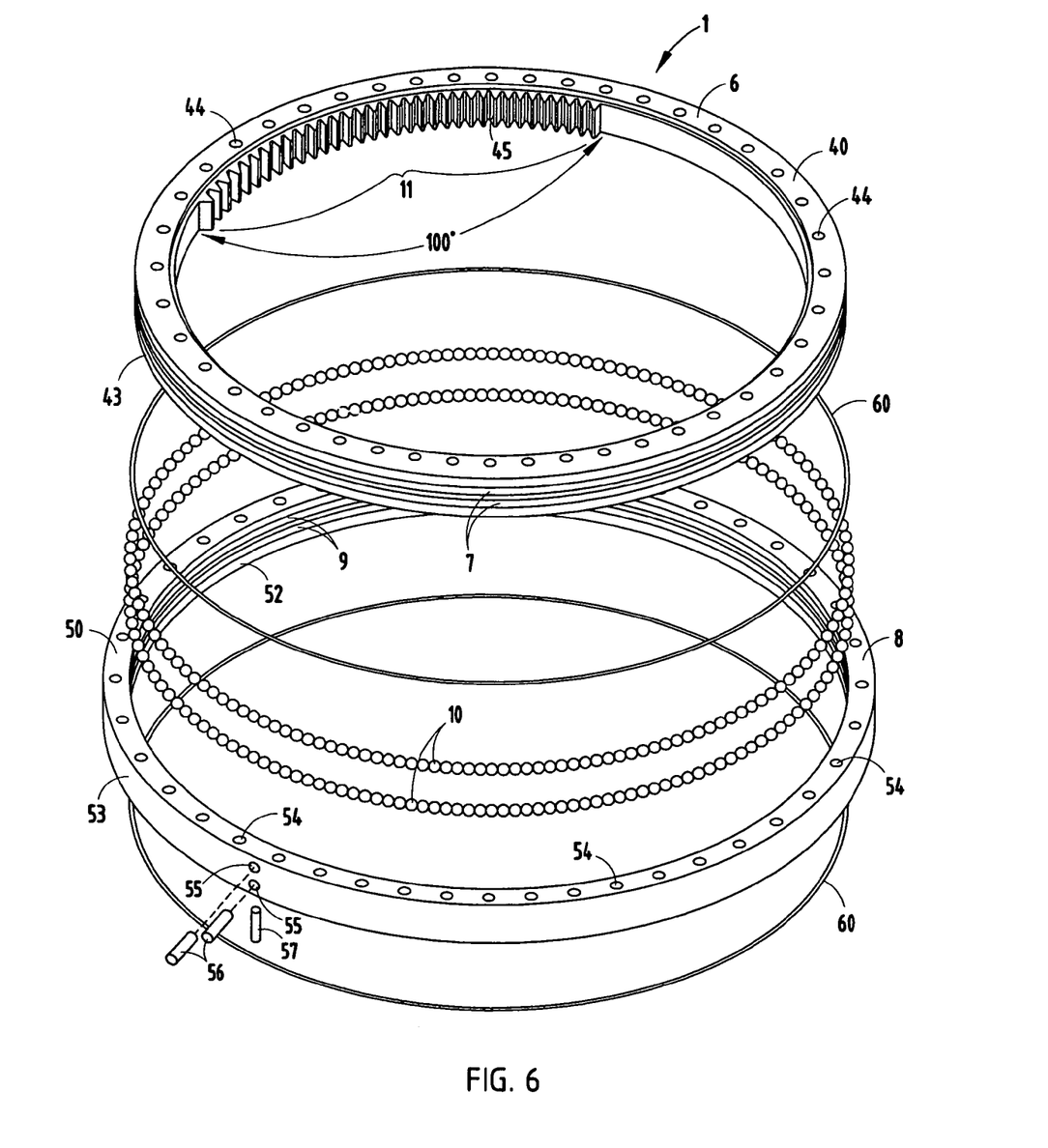
FIG. 6 is an exploded perspective view of the pitch bearing.

The reference numeral 1 (FIGS. 1-4) generally designates a pitch bearing embodying the present invention. Pitch bearing 1 is designed for use in conjunction with wind turbines, such as the wind turbine 2 illustrated in FIGS. 1-3, which has a rotor hub 3 supporting radially extending blades 4, and pitch drives 5 (FIG. 4) for axially pivoting blades 4 between different pitch angles. As best illustrated in FIGS. 4-6, pitch bearing 1 includes an annularly-shaped inner bearing ring 6 operably connected with an associated blade 4, and including first raceway grooves 7, as well as an annularly-shaped outer bearing ring 8 operably connected with rotor hub 3, configured for mating engagement with inner bearing ring 6, and including second raceway grooves 9 aligned with first raceway grooves 7. A plurality of rolling elements 10 are disposed in the first and second raceway grooves 7 and 9 to rotatably interconnect the inner and outer bearing rings 6 and 8. A partial gear or gear segment 11 is formed on or associated with one of the inner and outer bearing rings 6, 8 and engages an associated pitch drive 5 to pivot the attached blade 4 between the different pitch angles. The gear segment 11 has an arcuate measure of less than 200 degrees to facilitate economical manufacture.

Figures 1, 2, 3:
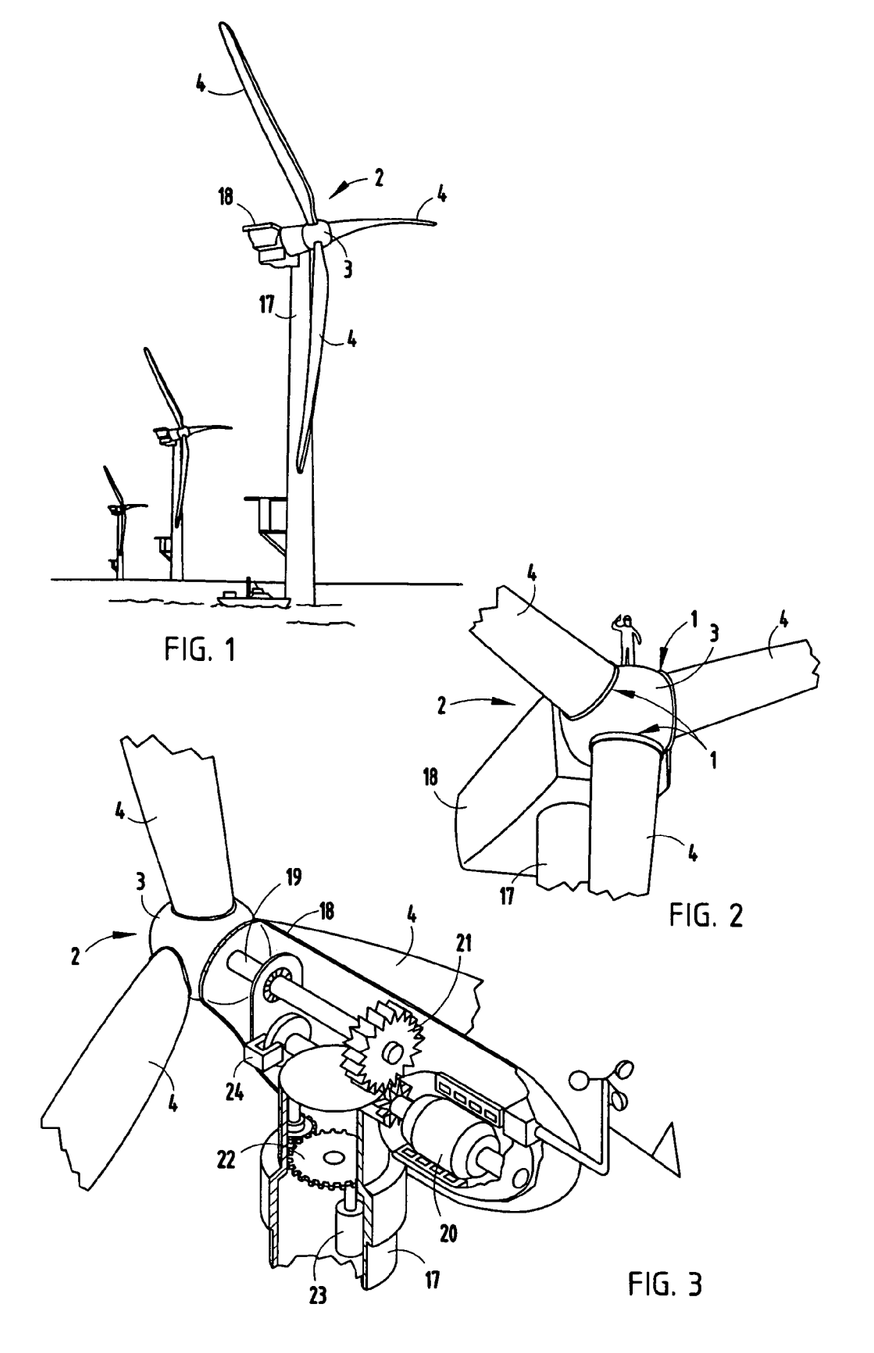
FIG. 1 is a perspective view of a wind electric turbine incorporating at least one pitch bearing embodying the present invention.
FIG. 2 is a fragmentary perspective view of the electric wind turbine.
FIG. 3 is a partially schematic view of the wind electric turbine, wherein portions thereof are broken away to reveal internal construction.

In the example illustrated in FIGS. 1-3, wind turbine 2 is a very large, propeller style, electric power producing turbine of the type capable of producing 1-5 megawatts of electrical power in either an on shore installation, or the off shore installation shown in FIG. 1. In general, the illustrated wind turbine 2 has a very tall support or tower 17 in the range of 50-120 meters, which supports on the upper end thereof a nacelle or housing 18. Rotor hub 3 is rotatably mounted at the forward end of housing 18 on a rotor shaft 19, which in turn drives an electrical power generator 20 through a gear box 21. The rotational position of housing 18 relative to tower 17 is adjusted through a yaw drive 22 and associated motor 23. In the illustrated example, a brake 24 is also provided in housing 18.

In the illustrated examples, rotor hub 3 supports three radially extending blades 4 positioned approximately 120 degrees apart on rotor hub 3. As best illustrated in FIG. 4, each blade 4 is rotated radially by an associated pitch drive 5, which comprises an electric motor 31, a drive shaft 32 and a pinion gear 33, which is configured to mate with the gear segment 11 on the associated pitch bearing 1. Each motor 31 is provided with a controller 34 to rotate blades 4 to their desired position, as determined by wind speed, direction, and other similar factors.

Figure 7:
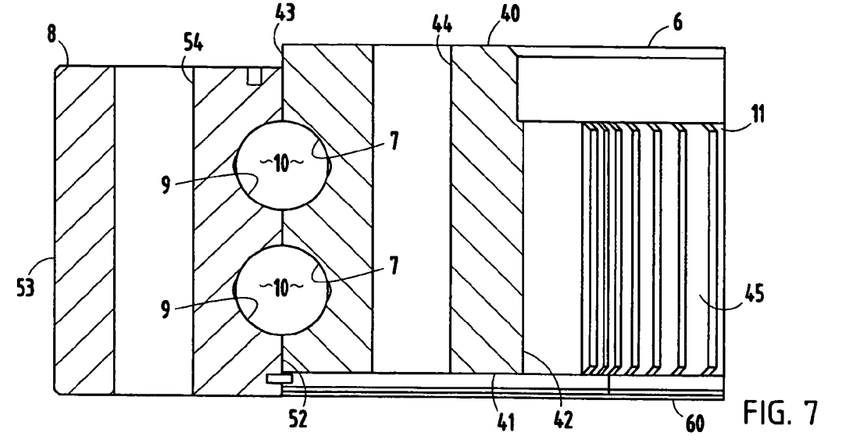
FIG. 7 is a fragmentary vertical cross-sectional view of the pitch bearing.

With reference to FIGS. 5-7, the illustrated inner bearing ring 6 is solid, and has a generally annular shape defined by forward and rearward faces or surfaces 40 and 41, which are generally flat and disposed in a parallel relationship, as well as radially inner and outer surfaces 42 and 43 respectively, which are cylindrical in shape and disposed concentrically. In the example shown in FIGS. 5-7, the outer surface 43 of inner bearing ring 6 includes two laterally spaced apart raceway grooves 7, which are of similar size and shape, to receive rolling elements 10 therein. Inner bearing ring 6 also includes a plurality of circumferentially-shaped apart fastener apertures 44 extending axially therethrough to detachably connect inner bearing ring 6 with an associated blade 4. The gear segment 11 shown in FIGS. 5-7 is formed on the inner surface 42 of inner bearing ring 6, and has an arcuate measure of around 100 degrees, although a gear segment 11 may extend up to around 200 degrees in arcuate measure. Gear segment 11 is defined by a plurality of teeth 45 shaped to mesh with an associated pinion gear, such as the illustrated spur gear 33 on drive shaft 32. It is to be understood that other types of gear teeth configurations, such as worn gears, etc., are also contemplated by the present invention.

The outer bearing ring 8 illustrated in FIGS. 5-7 is also solid, has an annular shape, and is defined by forward and rearward face or surfaces 50 and 51, which are generally flat and oriented mutually parallel, along with radially oriented inner surface 52 and outer surface 53, which are cylindrical in shape and disposed concentrically. The inner surface 52 of outer bearing ring 8 shown in FIGS. 5-7 also includes two radially spaced apart raceway grooves 9 which are oriented in radial alignment with the two sets of raceway grooves 7 in inner bearing 6, and are of similar size and shape to receive rolling elements 10 therein. Outer bearing ring 8 also includes a plurality of circumferentially spaced apart fastener apertures 54, which extend axially therethrough to detachably connect outer bearing ring 8 with rotor hub 3. Outer bearing ring 8 also includes two bearing loading holes 55 disposed radially through outer surface 53, which are aligned with the first and second raceway grooves 7 and 8 to load rolling elements 10 into raceway grooves 7, 9, so as to rotatably interconnect inner bearing ring 6 with outer bearing ring 8. Loading holes 55 receive plugs 56 therein after assembly. Retaining pins 57 may be used to positively lock plugs 56 in place.

In the illustrated examples, rolling elements 10 comprise a plurality of balls made of steel and/or other suitable materials, which may be selectively hardened to provide long operating life and smooth rotation between inner and outer bearing rings 6, 8. As best illustrated in FIG. 7, raceway grooves 7, 9 are configured relative to balls 10, so as to provide four point contact therebetween. It is to be understood that pitch bearing 1 may be equipped with other types of rolling elements 10, such as rollers, and the like.

At least one seal 60 (FIGS. 6 and 7) may be positioned between inner and outer bearing rings 6 and 8 to retain lubrication for rolling elements 10 in raceway grooves 7, 9. In the example illustrated in FIG. 6, two seals 60 are provided at opposite faces of the pitch bearing 1, whereas in the embodiment illustrated in FIG. 7, only one seal 60 is provided. Each seal 60 is sized and shaped in accordance with the configuration of pitch bearing 1, but otherwise has a conventional construction.

Each pitch bearing 1 may be fabricated in the following manner. The inner and outer bearing rings 6, 8 are made in an annular shape from steel or other suitable materials, and are formed with a predetermined number of raceway grooves 7, 9, in accordance with the specific application. As noted above, in the embodiment illustrated in FIGS. 5-7, both bearing rings 6, 8 include two laterally spaced apart raceway grooves 7, 9 to receive two sets of rolling elements 10 therein, so as to provide increased load carrying capacity. Fastener apertures 44 and 54 are formed axially through the surfaces 40, 41 and 50, 51 of inner and outer bearing rings 6, 8. Gear segment 11 is formed on either the inner surface 42 of inner bearing ring 6 or the outer surface 53 of outer bearing ring 8, prior to assembly. In both embodiments, gear segment 11 has an arcuate measure of less than 200 degrees, and preferably around 100 degrees, so as to reduce manufacturing costs. In the example illustrated in FIGS. 5-7, gear segment 11 is formed on the inner surface 42 of inner bearing ring 6. While gear segment 11 can be formed using conventional gear cutters and related techniques, the use of a gasher machine to form gear segment 11 has proven to be particularly economical.

Bearing rings 6, 8, along with gear teeth 45 may be hardened and/or coated with corrosion resistant materials, such as zinc, chrome, etc., for improved operating life, such as in off shore, salt water installations. Also, the exposed surfaces of bearing rings 6, 8 may be painted to inhibit oxidation.

After bearing rings 6, 8 have been fully formed, inner bearing ring 6 is positioned within outer bearing ring 8, so that raceway grooves 7 and 9 are axially aligned. Rolling elements 10 are inserted through the loading holes 55 in bearing ring 8 to fill raceway grooves 7, 9. Loading holes 55 are then plugged with plugs 56 to prevent rolling elements 10 from escaping from raceway grooves 7, 9. Seals 60 are then mounted between bearing rings 6, 8 in a conventional fashion.

During the assembly of the wind turbine 2 illustrated in FIG. 4, outer bearing ring 8 is detachably mounted on rotor hub 3 using fasteners 65, which are positioned through fastener apertures 54. Inner bearing ring 6 is detachably mounted to an associated blade 4 by fasteners 66 extending through fastener apertures 44. The drive gear 33 on pitch drive 30 is then meshed with the gear segment 11 on inner bearing ring 6, such that activation of motor 31 axially pivots the associated blade 4 between different pitch angles. In the illustrated example, each of the blades 4 is similarly attached to rotor hub 3.

Figure 8:
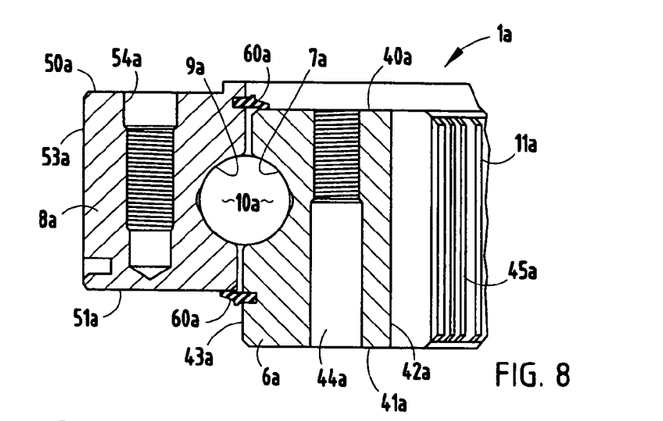
FIG. 8 is a fragmentary vertical cross-sectional view of another embodiment of the present invention.

The reference numeral 1a (FIG. 8) generally designates another embodiment of the present invention, which has a single set of rolling elements 10a. Since pitch bearing 1a is similar to the previously described pitch bearing 1, similar parts appearing in FIGS. 1-7 and 8 respectively are represented by the same, corresponding reference numerals, except for the suffix "a" in the numerals of the latter. In pitch bearing 1a, inner and outer bearing rings 6a, 8a have single raceway grooves 7a, 9a respectively, which are radially aligned, and receive one set of rolling elements 10a therein to rotatably interconnect the inner and outer bearing rings 6a, 8a. Furthermore, pitch bearing 1a includes a pair of seals 60a disposed between inner and outer bearing rings 6a, 8a on opposite sides of ball bearings 10a.

Figure 9:
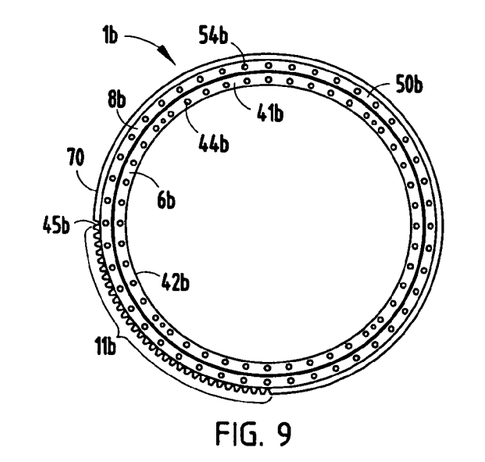
FIG. 9 is a plan view of yet another embodiment of the present invention.

The reference numeral 1b generally designates another embodiment of the present invention, which includes an outer flange 70. Since pitch bearing 1b is similar to the previously described pitch bearing 1, similar parts appearing in FIGS. 1-7 and 9 respectively are represented by the same, corresponding reference numerals, except for the suffix "b" in the numerals of the latter. In pitch bearing 1b, a flange 70 is disposed about outer bearing ring 8b. The teeth 45b of gear segment 11b are formed directly in flange 70, and extend thereabout in an arcuate measure of around 100 degrees. In pitch bearing 1b, inner bearing ring 6b is adapted to be fixedly attached to the associated rotor hub (not shown in FIG. 9), whereas outer bearing ring 8b is adapted to be attached to an associated blade (not shown in FIG. 9). Loading holes (not shown) are positioned radially through inner bearing ring 6b.

Figure 10:
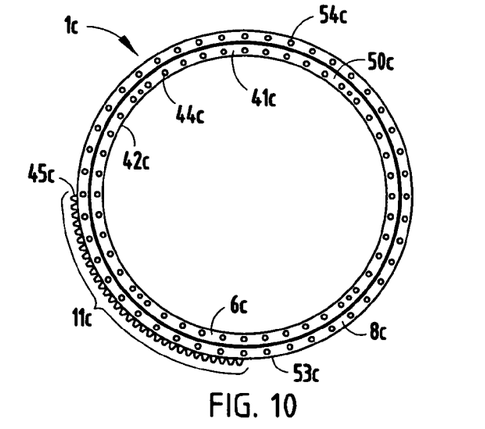
FIG. 10 is a plan view of yet another embodiment of the present invention.

The reference numeral 1c generally designates another embodiment of the present invention, having teeth 45c formed along the outer surface 53c of outer bearing ring 8c. Since pitch bearing 1c is similar to previously described pitch bearing 1b, similar parts appearing in FIG. 9 and FIG. 10 respectively are represented by the same, corresponding reference numerals, except for the suffix "c" in the numerals of the latter. In pitch bearing 1c, the non-toothed portion of the outer flange, of the type incorporated into pitch bearing 1b (FIG. 9), has been removed. Gear segment 11c is formed directly in the remaining portion of the outer flange, and extends an arcuate measure of approximately 100 degrees.

Pitch bearings 1, 1a, 1b and 1c are economical to manufacture, assemble and repair, and are particularly adapted for the proposed use.

In the foregoing description, it will be readily appreciated by those skilled in the art that modifications may be made to the invention without departing from the concepts disclosed herein. Such modifications are to be considered as included in the following claims, unless these claims, by their language, expressly state otherwise.

The invention claimed is:

1. In a wind electric turbine of the type having a rotor hub supporting at least one radially extending blade, and a pitch drive for axially pivoting said blade between different pitch angles, the improvement of a pitch bearing, comprising:
    an annularly-shaped outer bearing ring operably connected with one of said blade and said rotor hub and including a first raceway groove and a radially outwardly extending edge portion;
    an annularly-shaped inner bearing ring operably connected with the other of said blade and said rotor hub, configured for close mating reception within said outer bearing ring, and including a second raceway groove aligned with said first raceway groove in said outer bearing ring, and a radially inwardly extending edge portion;
    a plurality of rolling elements disposed in said first and second raceway grooves to rotatably interconnect said outer bearing ring and said inner bearing ring; and
    a gear segment integrally formed on one of said radially outwardly extending edge portion of said outer bearing ring and said radially inwardly extending edge portion of said inner bearing ring, and engaging said pitch drive to pivot said blade axially between the different pitch angles; said gear segment having an arcuate measure of less than 200 degrees to facilitate economical manufacture.

2. A wind electric turbine as set forth in claim 1, wherein:
    said gear segment has an arcuate measure of around 100 degrees.

3. A wind electric turbine as set forth in claim 1, wherein:
    said pitch drive includes a motor operably connected with said rotor hub, and a gear operably connected with said motor and meshed with said gear segment on said first bearing ring, whereby activation of said motor axially pivots said blade between the different pitch angles.

4. A wind electric turbine as set forth in claim 1, wherein:
    said balls and said first and second raceway grooves are configured to provide four point contact therebetween.

5. A wind electric turbine as set forth in claim 1, wherein:
    said inner and outer bearing rings are constructed from selectively hardened steel.

6. A wind electric turbine as set forth in claim 1, wherein:
    said inner and outer bearing rings include a zinc coating to inhibit oxidation; and
    at least a portion of said inner and outer bearing rings is painted to inhibit oxidation.

7. A wind electric turbine as set forth in claim 1, wherein:
    said inner and outer bearing rings include a pair of axially spaced apart first and second raceway grooves, each having said balls disposed therein.

8. A wind electric turbine as set forth in claim 1, including:
at least one seal disposed operably between said inner bearing ring and said outer bearing ring, and configured to retain lubrication for said balls in said first and second raceway grooves.

9. In a wind electric turbine of the type having a rotor hub supporting at least one radially extending blade, and a pitch drive for axially pivoting said blade between different pitch angles, the improvement of a pitch bearing, comprising:
an annularly-shaped first bearing ring operably connected with said blade and including a first raceway groove;
an annularly-shaped second bearing ring operably connected with said rotor hub, configured for mating engagement with said first bearing ring, and including a second raceway groove aligned with said first raceway groove in said first bearing ring;
a plurality of rolling elements disposed in said first and second raceway grooves to rotatably interconnect said first bearing ring and said second bearing ring;
a gear segment formed on one of said first bearing ring and said second bearing ring, and engaging said pitch drive to pivot said blade axially between the different pitch angles; said gear segment having an arcuate measure of less than 200 degrees to facilitate economical manufacture; and wherein
said bearing members comprise a plurality of balls closely received in said first and second raceway grooves; and
said balls and said first and second raceway grooves are configured to provide four point contact therebetween.

10. In a wind electric turbine of the type having a rotor hub supporting at least one radially extending blade, and a pitch drive for axially pivoting said blade between different pitch angles, the improvement of a pitch bearing, comprising:
an annularly-shaped first bearing ring operably connected with said blade and including a first raceway groove;
an annularly-shaped second bearing ring operably connected with said rotor hub, configured for mating engagement with said first bearing ring, and including a second raceway groove aligned with said first raceway groove in said first bearing ring;
a plurality of rolling elements disposed in said first and second raceway grooves to rotatably interconnect said first bearing ring and said second bearing ring;
a gear segment formed on one of said first bearing ring and said second bearing ring, and engaging said pitch drive to pivot said blade axially between the different pitch angles; said gear segment having an arcuate measure of less than 200 degrees to facilitate economical manufacture; and
at least one seal disposed operably between said first bearing ring and said second bearing ring, and configured to retain lubrication for said bearing members in said first and second raceway grooves.

11. In a method for making a wind electric turbine of the type having a rotor hub supporting at least one radially extending blade, and a pitch drive for axially pivoting the blade between different pitch angles, the improvement comprising:
forming an annularly-shaped first pitch bearing ring with a first raceway groove;
forming an annularly-shaped second pitch bearing ring with a second raceway groove;
positioning one of the first and second pitch bearing rings within the other of the first and second pitch bearing rings, such that the first raceway groove aligns with the second raceway groove;
forming a plurality of rolling elements shaped for close reception in the first and second raceway grooves;
positioning the rolling elements in the first and second raceway grooves in a predetermined circumferentially-shaped arrangement to rotatably interconnect the first and second pitch bearing rings;
forming a gear segment on one of the first and second pitch bearing rings with an arcuate measure of less than 200 degrees to facilitate economical manufacture;
operably connecting the blade with one of the first and second pitch bearing rings;
operably connecting the rotor hub with the other of the first and second pitch bearing rings;
engaging the pitch drive with the gear segment to pivot the blade axially between the different pitch angles;
providing the pitch drive with a motor operably connected with one of the rotor hub and the blade, and a pinion gear operably connected with the motor; and
meshing the pinion gear with the gear segment, whereby activation of the motor axially pivots the blade between the different pitch angles.

12. A method as set forth in claim 11, wherein:
the first bearing ring defines an inner bearing ring;
the second bearing ring defines an outer bearing ring; and
said positioning step includes inserting the inner bearing ring into the outer bearing ring for close mating reception therein.

13. A method as set forth in claim 11, wherein:
said gear forming step comprises forming the gear segment along one of a radially inwardly extending edge portion of the inner bearing ring and a radially outwardly extending edge portion of the outer bearing ring.

14. A method as set forth in claim 11, wherein:
said gear forming step comprises forming the gear segment with an arcuate measure of around 100 degrees.

15. A method as set forth in claim 11, including:
forming a plurality of circumferentially spaced apart fastener apertures axially through the inner bearing ring; and wherein
said connecting step comprises positioning a plurality of fasteners in the fastener apertures in the inner bearing ring, and detachably connecting the same with the blade.

16. A method as set forth in claim 11, including:
forming a plurality of circumferentially spaced apart fastener apertures axially through the outer bearing ring; and wherein
said connecting step comprises positioning a plurality of fasteners in the fastener apertures in the outer bearing ring, and detachably connecting the same with said rotor hub.

17. A method as set forth in claim 11, including:
installing at least one seal operably between the inner bearing ring and the outer bearing ring to retain lubrication for the rolling elements in the first and second raceway grooves.

18. A method as set forth in claim 11, wherein:
said rolling element forming step comprises forming balls.

19. A pitch bearing for wind turbines of the type having a rotor hub supporting at least one radially extending blade, and a pitch drive for axially pivoting the blade between different pitch angles, comprising:
- an annularly-shaped outer bearing ring configured for operable connection with one of the blade and the rotor hub, and including a first raceway groove and a radially outwardly extending edge portion;
- an annularly-shaped inner bearing ring configured for operable connection with the other of the blade and the rotor hub, and closely received within said outer bearing ring, and including a second raceway groove aligned with said first raceway groove in said outer bearing ring, and a radially inwardly extending edge portion;
- a plurality of rolling elements disposed in said first and second raceway grooves to rotatably interconnect said outer bearing ring and said inner bearing ring; and
- a gear segment formed integrally on one of said radially outwardly extending edge portion of said outer bearing ring and said radially inwardly extending edge portion of said inner bearing ring, and configured to engage the pitch drive to pivot the blade axially between the different pitch angles; said gear segment having an arcuate measure of less than 200 degrees to facilitate economical manufacture.

20. A pitch bearing as set forth in claim 19, wherein:
said gear segment has an arcuate measure of around 100 degrees.

21. A pitch bearing as set forth in claim 19, wherein:
said rolling elements comprise a plurality of balls closely received in said first and second raceway grooves.

22. A pitch bearing as set forth in claim 19, wherein:
said balls and said first and second raceway grooves are configured to provide four point contact therebetween.

23. A pitch bearing as set forth in claim 19, wherein:
said inner and outer bearing rings are constructed from selectively hardened steel.

24. A pitch bearing as set forth in claim 19, wherein:
said inner and outer bearing rings include a zinc coating to inhibit oxidation; and
at least a portion of said inner and outer bearing rings is painted to inhibit oxidation.

25. A pitch bearing as set forth in claim 19, wherein:
said inner and outer bearing rings include a pair of axially spaced apart first and second raceway grooves, each having said balls disposed therein.

26. A pitch bearing as set forth in claim 19, including:
at least one seal disposed operably between said inner bearing ring and said outer bearing ring, and configured to retain lubrication for said balls in said first and second raceway grooves.

* * * * *